(12) United States Patent
Kim et al.

(10) Patent No.: US 11,417,942 B2
(45) Date of Patent: Aug. 16, 2022

(54) ELECTRONIC APPARATUS WITH ANTENNA WITH INCREASED POWER TRANSMISSION EFFICIENCY

(71) Applicant: SAMSUNG DISPLAY CO., LTD., Yongin-si (KR)

(72) Inventors: Kiseo Kim, Yongin-si (KR); Jae-Kyoung Kim, Hwaseong-si (KR); Wonsang Park, Yongin-si (KR); Bonghyun You, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/072,588

(22) Filed: Oct. 16, 2020

(65) Prior Publication Data
US 2021/0135337 A1     May 6, 2021

(30) Foreign Application Priority Data
Nov. 1, 2019   (KR) ........................ 10-2019-0138538

(51) Int. Cl.
*H01Q 1/24*       (2006.01)
*G06F 3/044*     (2006.01)
*G06F 3/041*     (2006.01)

(52) U.S. Cl.
CPC ........... *H01Q 1/243* (2013.01); *G06F 3/0412* (2013.01); *G06F 3/0445* (2019.05);
(Continued)

(58) Field of Classification Search
CPC .... G06F 1/1626; G06F 1/1643; G06F 1/1698; G06F 1/0412; G06F 1/0446; G06F 1/0448; H01Q 1/243; H01Q 1/44
See application file for complete search history.

(56) References Cited

U.S. PATENT DOCUMENTS

2011/0273382 A1*  11/2011  Yoo ........................ H01Q 9/42
                                                             345/173
2015/0147967 A1*   5/2015  Park ..................... H04B 5/0081
                                                             455/41.1
(Continued)

FOREIGN PATENT DOCUMENTS

KR    10-2014-0100822    8/2014
KR    10-2016-0109751    9/2016
(Continued)

OTHER PUBLICATIONS

Translation of Foreign Patent Document N. (Year: 2018).*

*Primary Examiner* — Liliana Cerullo
(74) *Attorney, Agent, or Firm* — F. Chau & Associates, LLC

(57) ABSTRACT

The present disclosure relates to an electronic apparatus. The electronic apparatus includes a display panel, a pattern portion, and a circuit portion. The display panel includes an active area and a peripheral area. The pattern portion includes an antenna pattern disposed on the display panel and a first pad connected to the antenna pattern. The circuit portion includes a second pad facing the first pad, wherein the second pad is spaced apart from the first pad by a predetermined distance. The second pad is capacitively-coupled to the first pad and a radio frequency device electrically connected to the second pad.

17 Claims, 10 Drawing Sheets

(52) U.S. Cl.
CPC ........ *G06F 3/0446* (2019.05); *G06F 3/04164* (2019.05); *G06F 2203/04102* (2013.01)

(56) References Cited

U.S. PATENT DOCUMENTS

| | | | |
|---|---|---|---|
| 2017/0083153 A1 | 3/2017 | Yeh et al. | |
| 2018/0026341 A1* | 1/2018 | Mow | H04B 10/90 343/702 |
| 2018/0115073 A1 | 4/2018 | Sakurai | |
| 2019/0288382 A1* | 9/2019 | Kamgaing | H01Q 21/0025 |
| 2020/0388913 A1* | 12/2020 | Chai | H01Q 1/273 |

FOREIGN PATENT DOCUMENTS

| | | | | |
|---|---|---|---|---|
| KR | 10-2017-0035756 | | 3/2017 | |
| KR | 10-2018-0044197 | | 5/2018 | |
| KR | 10-2018-0076862 | * | 7/2018 | .......... H04M 1/0268 |
| KR | 10-2021-0041156 | | 4/2021 | |

* cited by examiner

ELECTRONIC APPARATUS WITH ANTENNA WITH INCREASED POWER TRANSMISSION EFFICIENCY

CROSS-REFERENCE TO RELATED APPLICATION

This U.S. non-provisional patent application claims priority under 35 U.S.C. § 119 of Korean Patent Application No. 10-2019-0138538, filed on Nov. 1, 2019, the contents of which are incorporated by reference herein in its entirety.

BACKGROUND

1. Field of Disclosure

The present disclosure relates to an electronic apparatus including an antenna with increased power transmission efficiency.

2. Description of the Related Art

Electronic devices such as mobile phones, smart watches, or portable tablets may contain antenna devices for the transmission and reception of information. The antenna device may be located inside the electronic device. As the size of electronic devices decreases, the space available for various components becomes smaller, and reflection loss becomes a larger problem.

Reflection loss may result in faulty antenna signals, poor or intermittent antenna signal transmission, or lack of signal, altogether. Problems with signal transmission may render an electronic device less useful, as communication may be one of the primary functions of the device. Therefore, there is a need in the art for increased power transmission efficiency as electronic devices become smaller.

SUMMARY

The present disclosure provides an electronic apparatus with an antenna with increased power transmission efficiency.

Embodiments of the inventive concept provide an electronic apparatus include a display panel including an active area and a peripheral area; a pattern portion comprising an antenna pattern disposed on the display panel and a first pad connected to the antenna pattern; and a circuit portion comprising a second pad facing the first pad, spaced apart from the first pad by a predetermined distance, and capacitive-coupled to the first pad, the circuit portion further comprising a radio frequency device electrically connected to the second pad.

A size of one pad of the first pad and the second pad is greater than a size of the other pad of the first pad and the second pad. The first pad overlaps the second pad in a plan view. A size of an area where the first pad overlaps the second pad is equal to a smallest size among a size of the first pad and a size of the second pad. The antenna pattern overlaps the active area in a plan view.

The electronic apparatus further includes a dielectric layer disposed between the first pad and the second pad. The dielectric layer includes an organic layer and a spacer disposed in the organic layer. The spacer has a thickness that is equal to the predetermined distance. The organic layer attaches the first pad to the second pad.

The electronic apparatus further includes a base layer disposed between the first pad and the second pad. The first pad is disposed on a first surface of the base layer, and the second pad is disposed on a second surface facing the first surface of the base layer. The pattern portion further includes a plurality of sensing electrodes disposed to overlap the active area, a plurality of sensing lines disposed to overlap the peripheral area and electrically and respectively connected to the sensing electrodes, and a plurality of sensing pads disposed to overlap the peripheral area and electrically and respectively connected to the sensing lines.

Each of the sensing electrodes includes a plurality of sensing patterns and a connection pattern connecting two sensing patterns adjacent to each other among the sensing patterns, and the sensing patterns are disposed on a same layer as the antenna pattern.

The electronic apparatus further includes an input sensor disposed between the display panel and the pattern portion. The input sensor includes a plurality of sensing electrodes disposed to overlap the active area, a plurality of sensing lines disposed to overlap the peripheral area and electrically and respectively connected to the sensing electrodes, and a plurality of sensing pads disposed to overlap the peripheral area and electrically and respectively connected to the sensing lines.

The antenna pattern overlaps the sensing electrodes. The antenna pattern does not overlap the sensing electrodes. The electronic apparatus further includes a window disposed on the display panel. The window includes a flat portion and a bending portion bent from the flat portion, and the flat portion and the bending portion overlap the active area. The bending portion overlaps the antenna pattern. The pattern portion further includes a line that electrically connects the antenna pattern to the first pad, the line is bent toward a lower surface of the display panel, and the circuit portion is disposed under the display panel. The line and the first pad overlap the peripheral area.

According to the above, the first pad connected to the antenna pattern and the second pad connected to the radio frequency device may be capacitively-coupled to each other. The size of the area where the first pad overlaps the second pad is constant, and the first pad and the second pad may be spaced apart from each other. Therefore, the capacitance between the first pad and the second pad may be kept constant. Accordingly, an impedance matching between the first pad and the second pad may be facilitated, and a reflection loss due to an impedance mismatch may be reduced. Therefore, the electronic apparatus with the antenna with increased power transmission efficiency may be provided.

BRIEF DESCRIPTION OF THE DRAWINGS

Details of the present disclosure will become readily apparent by reference to the following detailed description when considered in conjunction with the accompanying drawings wherein.

DETAILED DESCRIPTION

Figure 1:
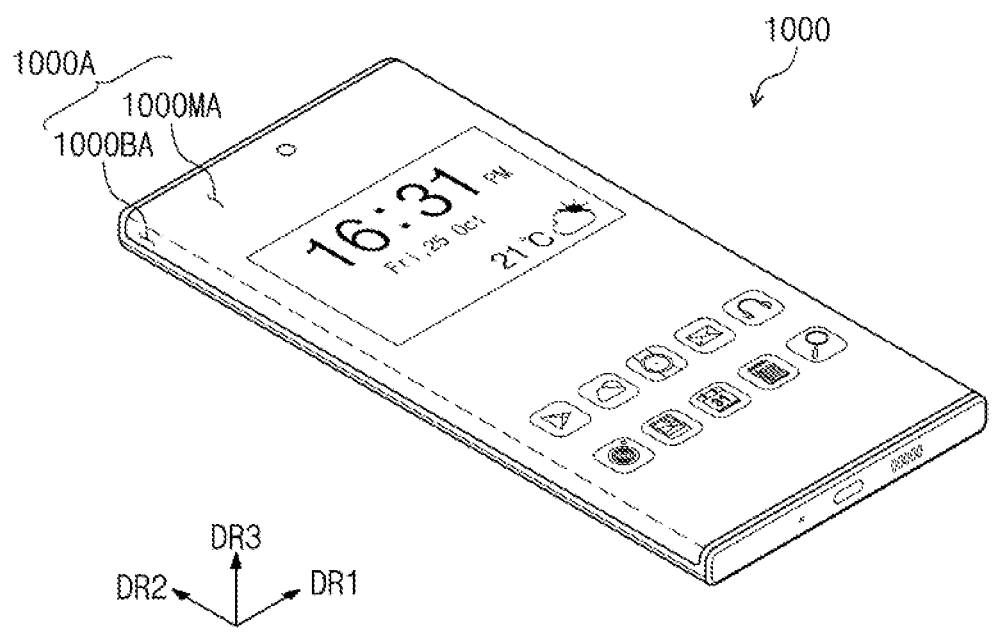
FIG. 1 is a perspective view showing an electronic apparatus according to an embodiment of the present disclosure.

The present disclosure relates to a radio frequency device. Embodiments of the present disclosure include a radio frequency device with increased power transmission efficiency. A variety of electronic devices may include an antenna device. As portable devices becomes thinner and smaller, and the number of electronic modules in the devices grows larger, the space in which antennas are mounted decreases.

According to embodiments of the present disclosure a radio frequency device includes a display panel, a pattern portion, and a circuit portion. The display panel may include an active area and a peripheral area. The pattern portion includes an antenna pattern disposed on the display panel and a first pad connected to the antenna pattern. The circuit portion includes a second pad facing the first pad, wherein the second pad is spaced apart from the first pad by a predetermined distance. The second pad is capacitively-coupled to the first pad and a radio frequency device electrically connected to the second pad.

The first pad is connected to the antenna pattern and the second pad is connected to the radio frequency device and may be capacitively-coupled to each other. The size of the area in which the first pad overlaps the second pad is constant. The first pad and the second pad may be spaced apart from each other. Therefore, the capacitance between the first pad and the second pad may be kept constant. Accordingly, an impedance matching between the first pad and the second pad may be facilitated, and a reflection loss due to an impedance mismatch may be reduced. Thus, the electronic apparatus may achieve improved power transmission efficiency.

In the present disclosure, it will be understood that when an element or layer is referred to as being "on", "connected to" or "coupled to" another element or layer, the element or layer can be directly on, connected, or coupled to the other element or layer or intervening elements or layers may be present. Like numerals refer to like elements throughout. In the drawings, the thickness, ratio, and dimension of components are exaggerated for an effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections is not limited by these terms. These terms are used to distinguish one element, component, region, layer or section from another region, layer or section. Therefore, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as with a meaning consistent with the term's meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

FIG. 1 is a perspective view showing an electronic apparatus 1000 according to an embodiment of the present disclosure.

Referring to FIG. 1, the electronic apparatus 1000 may be an apparatus activated in response to an electrical signal. For example, the electronic apparatus 1000 may be a mobile phone, a tablet computer, a navigation unit, a game unit, or a wearable unit, however, the electronic apparatus 1000 is not limited thereto or thereby. FIG. 1 shows the mobile phone as a representative example of the electronic apparatus 1000.

The electronic apparatus 1000 may display an image through an active area 1000A. The active area 1000A may include a first display surface 1000MA substantially parallel to a plane defined by a first direction DR1 and a second direction DR2 and a second display surface 1000BA bent from the first display surface 1000MA.

The second display surface 1000BA may be bent from one side of the first display surface 1000MA. The second display surface 1000BA may be provided in a plural number. In this case, the second display surface 1000BA may be bent from at least two sides of the first display surface 1000MA. The active area 1000A may include one first display surface 1000MA and one or more and four or less second display surfaces 1000BA. However, the shape of the active area 1000A is not limited thereto or thereby, and the active area 1000A may include the first display surface 1000MA.

A thickness direction of the electronic apparatus 1000 may be substantially parallel to a third direction DR3 crossing the first direction DR1 and the second direction DR2. Accordingly, front (or upper) and rear (or lower)

surfaces of each member of the electronic apparatus 1000 may be defined with respect to the third direction DR3.

Figure 2:
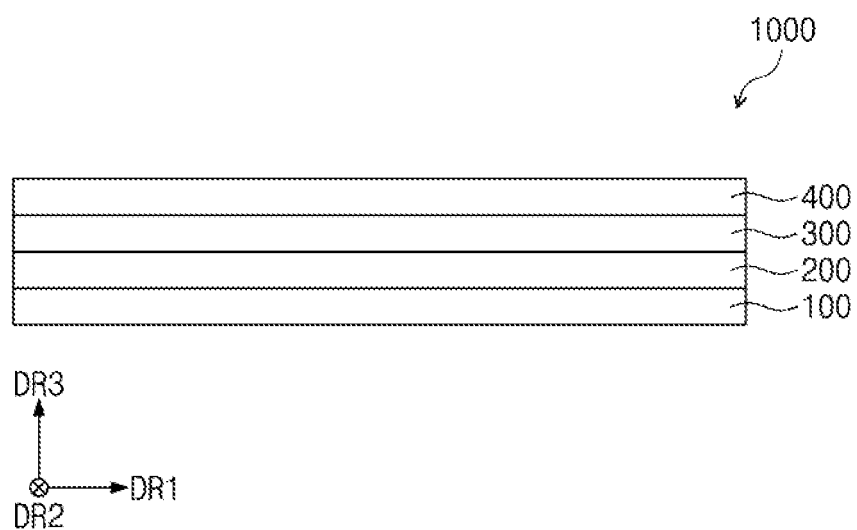
FIG. 2 is a cross-sectional view schematically showing an electronic apparatus according to an embodiment of the present disclosure.

FIG. 2 is a cross-sectional view schematically showing the electronic apparatus 1000 according to an embodiment of the present disclosure.

Referring to FIG. 2, the electronic apparatus 1000 may include a display panel 100, an input sensor 200, an antenna 300, and a window 400.

The display panel 100 may substantially generate the image. The display panel 100 may be a light-emitting type display panel. For example, the display panel 100 may be an organic light-emitting display panel or a quantum dot light-emitting display panel.

The input sensor 200 may be disposed on the display panel 100. The input sensor 200 may sense an external input applied thereto from the outside. The external input may be a user input. The user input may include a variety of external inputs, such as a part of user's body, light, heat, pen, or pressure.

The input sensor 200 may be formed on the display panel 100 through successive processes. Additionally or alternatively, the input sensor 200 may be coupled to the display panel 100 by an adhesive member. The adhesive member may include a conventional adhesive or a pressure-sensitive adhesive. For example, the adhesive member may be a transparent adhesive member, such as a pressure-sensitive adhesive (PSA) film, an optically clear adhesive (OCA) film, or an optically clear resin (OCR) but the adhesive member is not limited thereto.

The antenna 300 may be disposed on the input sensor 200. The antenna 300 may transmit, receive, or both transmit and receive a wireless communication signal, for example, a radio frequency signal. The antenna 300 may include a plurality of antenna patterns. The antenna patterns may transmit, receive, or both transmit and receive the same frequency band as each other or may transmit, receive, or both transmit and receive different frequency bands from each other.

The antenna 300 may be provided in the active area 1000A (refer to FIG. 1). Although the electronic apparatus 1000 becomes thinner or decreases in size, or a peripheral area of the active area 1000A (refer to FIG. 1) is reduced, a space in which the antenna 300 is disposed may be obtained since a size of the active area 1000A (refer to FIG. 1) is secured.

The window 400 may be disposed on the antenna 300. The window 400 may include an optically transparent insulating material. For example, the window 400 may include a glass or plastic material. The window 400 may have a single-layer or multi-layer structure. As an example, the window 400 may include a plurality of plastic films attached to each other by an adhesive or a glass substrate. The window 400 may also include a plastic film attached to the glass substrate by an adhesive.

In FIG. 2, the antenna 300 is disposed between the input sensor 200 and the window 400, however, the antenna 300 is not limited thereto or thereby. For example, the antenna 300 may be disposed between the input sensor 200 and the display panel 100 or may be disposed in an area of the input sensor 200.

Figure 3:
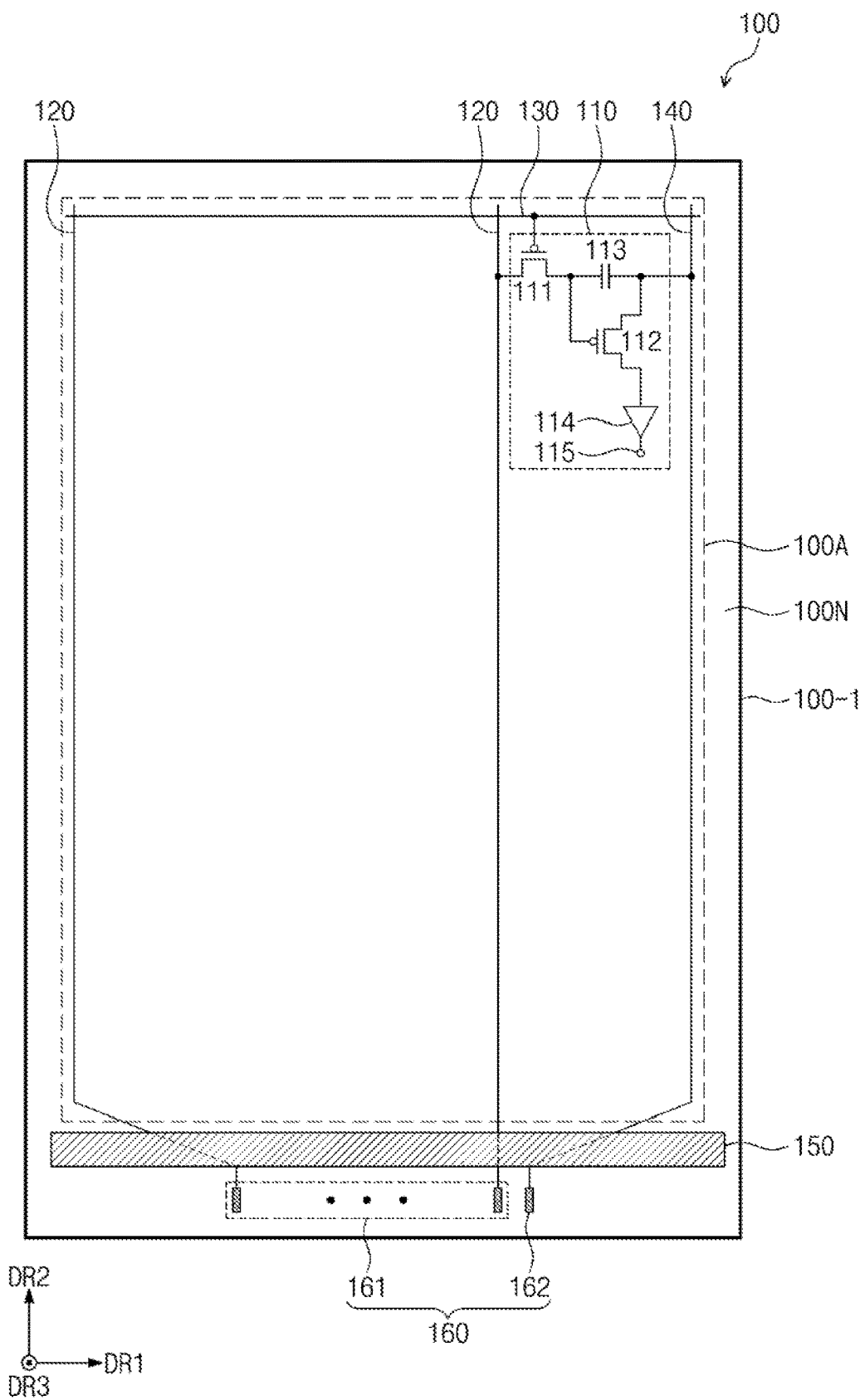
FIG. 3 is a plan view showing a display panel according to an embodiment of the present disclosure.

FIG. 3 is a plan view showing the display panel 100 according to an embodiment of the present disclosure.

Referring to FIG. 3, the display panel 100 may include an active area 100A and a peripheral area 100N. The active area 100A may be activated in response to electrical signals. For example, the active area 100A may display an image. The peripheral area 100N may surround the active area 100A. A driving circuit or a driving line may be disposed in the peripheral area 100N to drive the active area 100A. The active area 100A may correspond to the first display surface 1000MA (refer to FIG. 1) and the second display surface 1000BA (refer to FIG. 1) of the electronic apparatus 1000 (refer to FIG. 1).

The display panel 100 may include a base layer 100-1, a plurality of pixels 110, a plurality of signal lines 120, 130, and 140, a power pattern 150, and a plurality of display pads 160.

The base layer 100-1 may include a synthetic resin film. A synthetic resin film may include a heat-curable resin. The base layer 100-1 may have a multi-layer structure. For instance, the base layer 100-1 may have a three-layer structure of a synthetic resin layer, an adhesive layer, and a synthetic resin layer. The synthetic resin layer may include at least one of a polyimide-based resin, an acrylic-based resin, a methacrylic-based resin, a polyisoprene, a vinyl-based resin, an epoxy-based resin, a urethane-based resin, a cellulose-based resin, a siloxane-based resin, a polyamide-based resin, and a perylene-based resin, however, the synthetic resin layer is not particularly limited. Further, the base layer 100-1 may include a glass substrate or an organic/inorganic composite substrate.

The signal lines 120, 130, and 140 may be electrically connected to the pixels 110 and may transmit electrical signals to the pixels 110. In FIG. 3, the signal lines 120, 130, and 140 may include a data line 120, a scan line 130, and a power line 140 as a representative example, however, this is merely exemplary. The signal lines 120, 130, and 140 may further include at least one of an initialization voltage line and a light-emitting control line, however, the signal lines is not particularly limited.

The pixels 110 may be arranged in the active area 100A. In the present embodiment, as a representative example, an equivalent circuit diagram of one pixel 110 is enlarged and shown. The pixel 110 may include a first transistor 111, a second transistor 112, a capacitor 113, a light-emitting element 114, and a power terminal 115. The first transistor 111 may be a switching device that controls an on-off of the pixel 110. The first transistor 111 may transmit or block a data signal applied thereto through the data line 120 in response to a scan signal applied thereto through the scan line 130.

The capacitor 113 may be connected to the first transistor 111 and the power line 140. The capacitor 113 may be charged with an electric charge by an amount corresponding to a difference between the data signal provided from the first transistor 111 and a first power signal applied to the power line 140.

The second transistor 112 may be connected to the first transistor 111, the capacitor 113, and the light-emitting element 114. The second transistor 112 may control a driving current flowing through the light-emitting element 114 in response to the amount of the electric charge charged in the capacitor 113. A turn-on time of the second transistor 112 may be determined depending on the amount of the electric charge charged in the capacitor 113. The second transistor 112 may provide the first power signal provided through the power line 140 to the light-emitting element 114 during its turn-on time.

The light-emitting element 114 may generate a light or may control an amount of the light in response to an electrical signal. For example, the light-emitting element 114 may include an organic light-emitting element or a quantum dot light-emitting element.

The light-emitting element 114 may be connected to a power terminal 115 and may receive a power signal (hereinafter, referred to as a "second power signal") different from the first power signal provided from the power line 140. The driving current corresponding to a difference between an electrical signal provided from the second transistor 112 and the second power signal may flow through the light-emitting element 114, and the light-emitting element 114 may generate the light corresponding to the driving current. Meanwhile, this is merely exemplary, and the pixel 110 may include electronic devices with various configurations and arrangements, however, the pixel 110 is not particularly limited.

The power pattern 150 may be disposed in the peripheral area 100N. The power pattern 150 may be electrically connected to the power lines 140. As the display panel 100 includes the power pattern 150, the first power signal with substantially the same level may be provided to the plurality of pixels.

The display pads 160 may include a first pad 161 and a second pad 162. The first pad 161 may be provided in a plural number, and the first pads 161 may be respectively connected to the data lines 120. The second pad 162 may be connected to the power pattern 150 and may be electrically connected to the power line 140. The display panel 100 may provide electrical signals provided from the outside through the display pads 160 to the pixels 110. Meanwhile, the display pads 160 may further include other pads to receive other electrical signals in addition to the first pad 161 and the second pad 162, and is not particularly limited.

Figure 4:
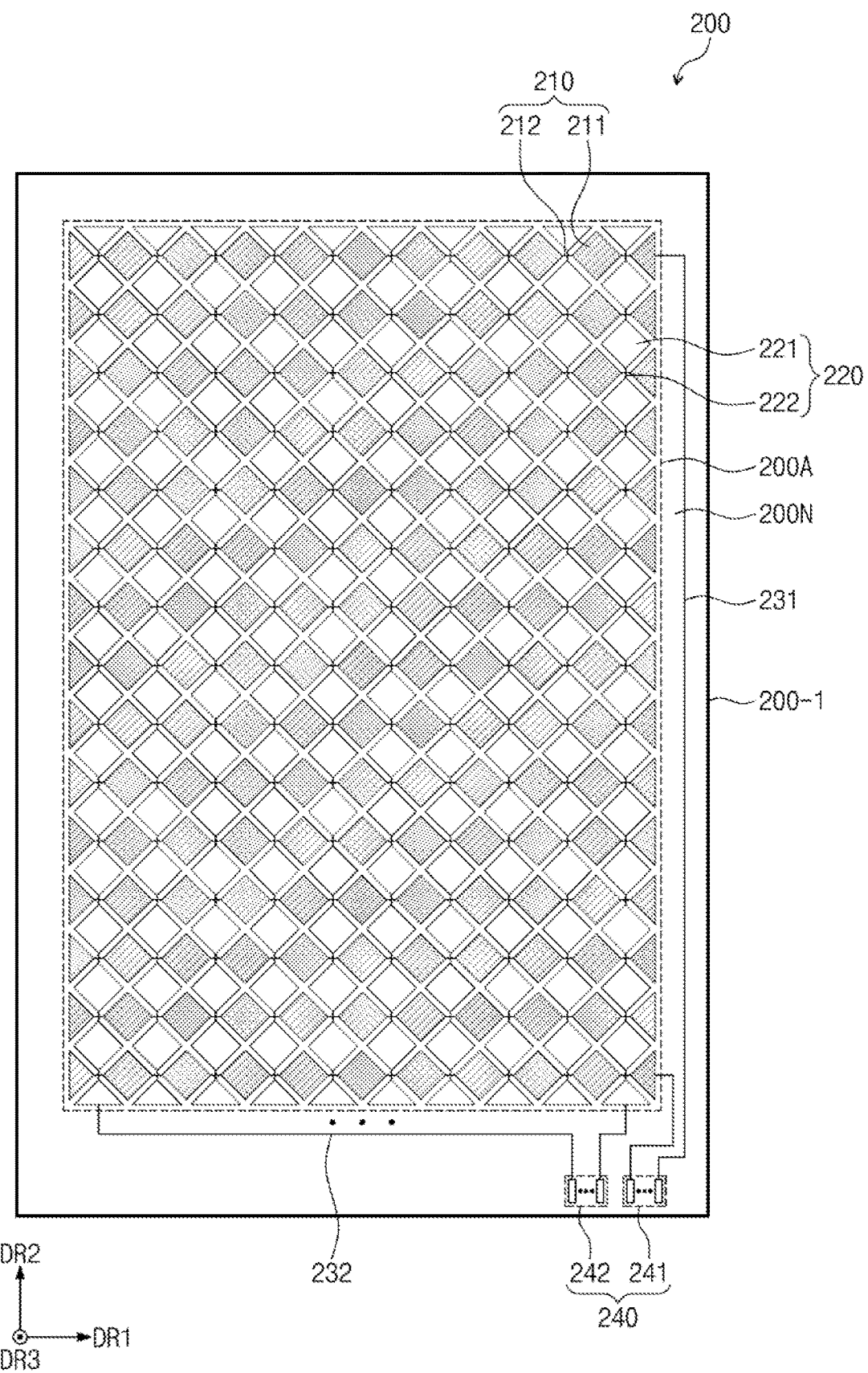
FIG. 4 is a plan view showing an input sensor according to an embodiment of the present disclosure.

FIG. 4 is a plan view showing the input sensor 200 according to an embodiment of the present disclosure.

Referring to FIG. 4, the input sensor 200 may include a sensing area 200A and a peripheral area 200N. The sensing area 200A may be activated in response to electrical signals. For example, the sensing area 200A may be an area to sense an input. A size of the sensing area 200A may be equal to or smaller than the size of the active area 100A (refer to FIG. 3) of the display panel 100 (refer to FIG. 3). The peripheral area 200N may surround the sensing area 200A.

The input sensor 200 may include a base insulating layer 200-1, first sensing electrodes 210, second sensing electrodes 220, sensing lines 231 and 232, and sensing pads 240. The first sensing electrodes 210 and the second sensing electrodes 220 may be disposed in the sensing area 200A, and the sensing lines 231 and 232 and sensing pads 240 may be disposed in the peripheral area 200N.

The base insulating layer 200-1 may be an inorganic layer that includes one of silicon nitride, silicon oxynitride, and silicon oxide. Additionally or alternatively, the base insulating layer 200-1 may be an organic layer that includes an epoxy resin, an acrylic resin, or an imide-based resin. The base insulating layer 200-1 may be formed directly on the display panel 100 (refer to FIG. 2). Additionally or alternatively, the base insulating layer 200-1 may be one component of the display panel 100 (refer to FIG. 2). Additionally or alternatively, the base insulating layer 200-1 may be formed on a separate base layer, and the base layer may be coupled to the display panel 100 (refer to FIG. 2) by an adhesive member.

The input sensor 200 may obtain information about the external input based on a variation in capacitance between the first sensing electrodes 210 and the second sensing electrodes 220.

Each of the first sensing electrodes 210 may extend in the first direction DR1, and the first sensing electrodes 210 may be arranged in the second direction DR2. The first sensing electrodes 210 may include first sensing patterns 211 and first connection patterns 212. Each of the first connection patterns 212 may electrically connect two or more first sensing patterns 211 adjacent to each other.

Each of the second sensing electrodes 220 may extend in the second direction DR2, and the second sensing electrodes 220 may be arranged in the first direction DR1. The second sensing electrodes 220 may include second sensing patterns 221 and second connection patterns 222. Each of the second connection patterns 222 may electrically connect two or more second sensing patterns 221 adjacent to each other.

The sensing lines 231 and 232 may include a plurality of first sensing lines 231 and a plurality of second sensing lines 232. The first sensing lines 231 may be electrically and respectively connected to the first sensing electrodes 210. The second sensing lines 232 may be electrically and respectively connected to the second sensing electrodes 220.

The sensing pads 240 may include a plurality of first sensing pads 241 and a plurality of second sensing pads 242. The first sensing pads 241 may be respectively connected to the first sensing lines 231. The second sensing pads 242 may be respectively connected to the second sensing lines 232.

Figure 5:
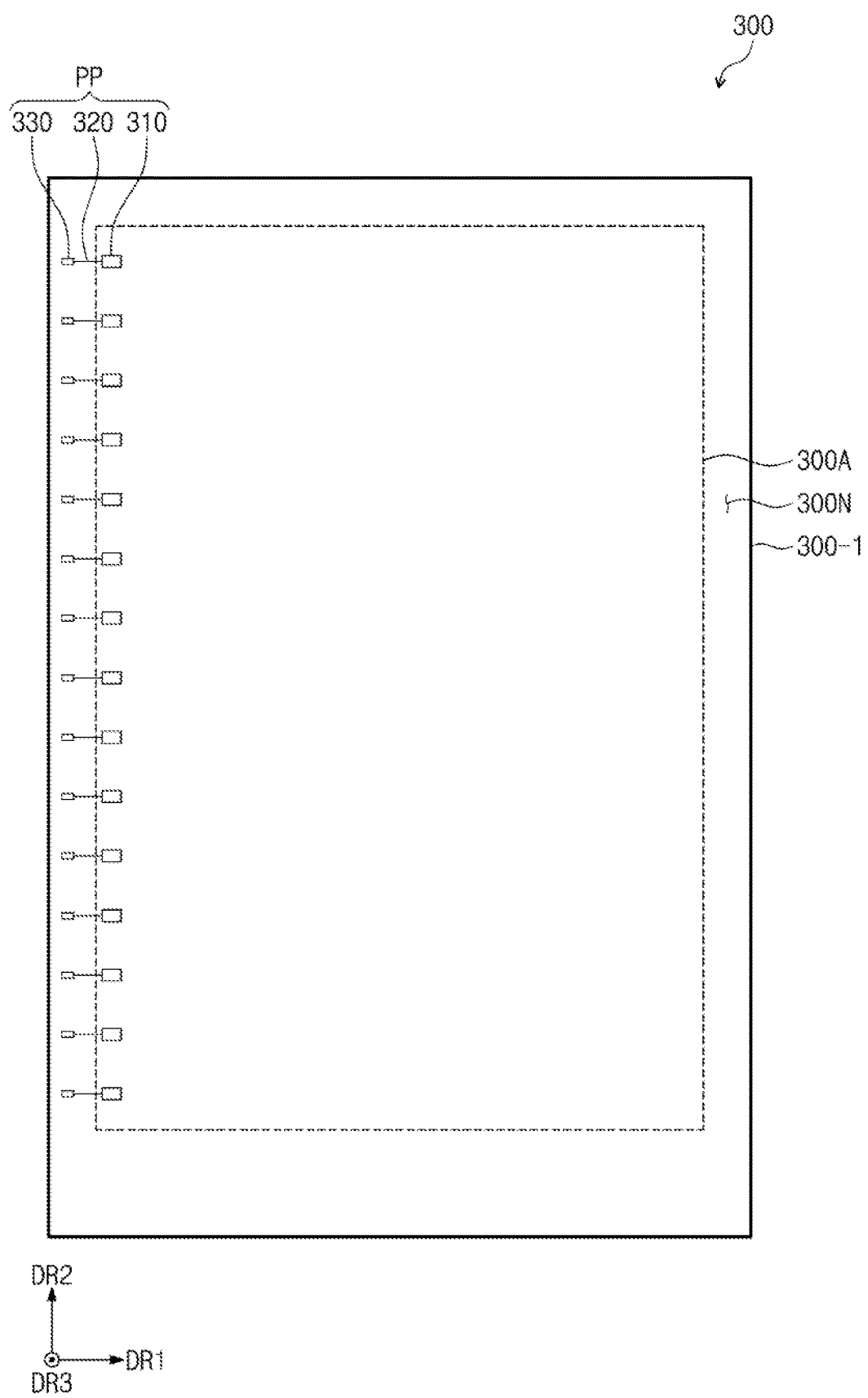
FIG. 5 is a plan view showing an antenna according to an embodiment of the present disclosure.

FIG. 5 is a plan view showing the antenna 300 according to an embodiment of the present disclosure.

Referring to FIG. 5, the antenna 300 may include an antenna area 300A and a peripheral area 300N which are defined therein. The antenna area 300A may correspond to the active area 100A (refer to FIG. 3) of the display panel 100 (refer to FIG. 3). The peripheral area 300N may surround the antenna area 300A.

The antenna 300 may include a base layer 300-1 and a pattern portion PP.

The base layer 300-1 may include an insulating material with a predetermined dielectric constant. The base layer 300-1 may include a light-transmissive film. For example, the base layer 300-1 may include at least one of an acrylic-based resin, a methacrylic-based resin, a polyisoprene, a vinyl-based resin, an epoxy-based resin, a urethane-based resin, a cellulose-based resin, a siloxane-based resin, a polyamide-based resin, and a perylene-based resin but the base layer 300-1 is not limited thereto.

The pattern portion PP may be disposed on the base layer 300-1. The pattern portion PP may include an antenna pattern 310, a line 320, and a first pad 330.

The antenna pattern 310 may be disposed in the antenna area 300A. The antenna pattern 310 may overlap the first and second sensing electrodes 210 and 220 (refer to FIG. 4). The antenna pattern 310 may be disposed to overlap the active area 100A (refer to FIG. 3) of the display panel 100 (refer to FIG. 3). The antenna pattern 310 may have a mesh structure such that the image provided through the active area 100A (refer to FIG. 3) transmits through the antenna pattern 310. The mesh structure may mean a structure in which a plurality of openings is defined through a predetermined layer. The antenna pattern 310 may be changed to a variety of shapes in the antenna area 300A, and a design freedom of the antenna pattern 310 may be increased.

The size of the active area 100A (refer to FIG. 3) of the display panel 100 (refer to FIG. 3) may be substantially the same as the size of the sensing area 200A (refer to FIG. 4) of the input sensor 200 (refer to FIG. 4). In this case, the antenna pattern 310 may overlap the sensing area 200A (refer to FIG. 4) of the input sensor 200 (refer to FIG. 4).

Different from FIG. 5, the size of the sensing area 200A (refer to FIG. 4) of the input sensor 200 (refer to FIG. 4) may be smaller than the size of the active area 100A (refer to FIG. 3) of the display panel 100 (refer to FIG. 3). In this case, the antenna pattern 310 may not overlap the first and second sensing electrodes 210 and 220 (refer to FIG. 4).

The line 320 may include the same material as the antenna pattern 310 and may be formed through the same process as the antenna pattern 310. The line 320 may extend from the antenna pattern 310 to the peripheral area 300N.

The antenna pattern 310 and the line 320 may include a conductive material. For example, the antenna pattern 310 and the line 320 may include a carbon nanotube, a metal material, a metal alloy, or composites thereof and may have a single-layer or multi-layer structure. For example, the metal material may be silver (Ag), copper (Cu), aluminum (Al), gold (Au), or platinum (Pt), however, the metal material is not limited thereto or thereby.

The first pad 330 may be electrically connected to the line 320. The first pad 330 may be disposed in the peripheral area 300N.

The line 320 and the first pad 330 may overlap the peripheral area 100N (refer to FIG. 3) of the display panel 100 (refer to FIG. 3).

The antenna 300 may further include a ground electrode disposed under the base layer 300-1.

The antenna 300 may further include a dummy pattern disposed to overlap the antenna area 300A. The dummy pattern may be spaced apart from the antenna pattern 310 and may have the same structure as the antenna pattern 310. For example, both the dummy pattern and the antenna pattern 310 may have the mesh structure. As the dummy pattern is disposed in the area in which the antenna pattern 310 is not disposed, a difference in reflectance between the area in which the antenna pattern 310 is disposed and the area in which the antenna pattern 310 is not disposed may be reduced. Accordingly, the antenna pattern 310 may be prevented from being viewed from the outside.

Figure 6:
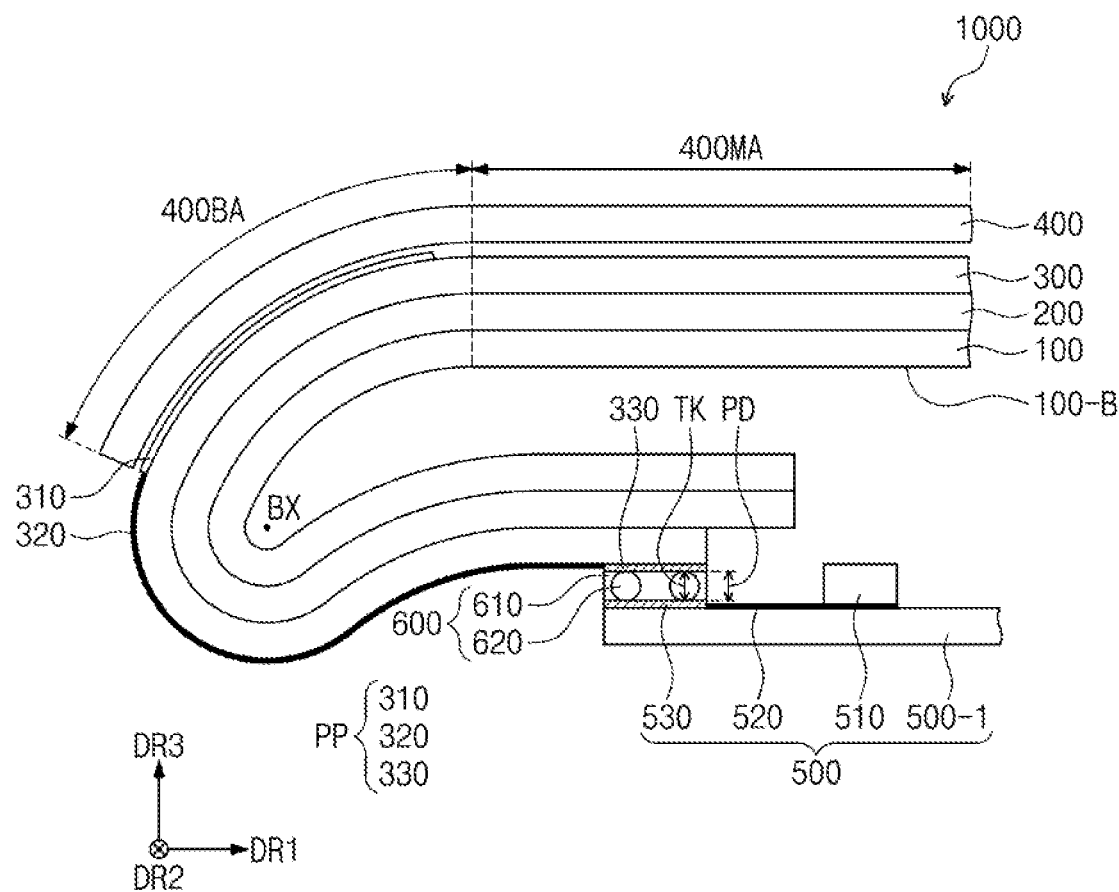
FIG. 6 is a cross-sectional view showing an electronic apparatus according to an embodiment of the present disclosure.
Figure 7:
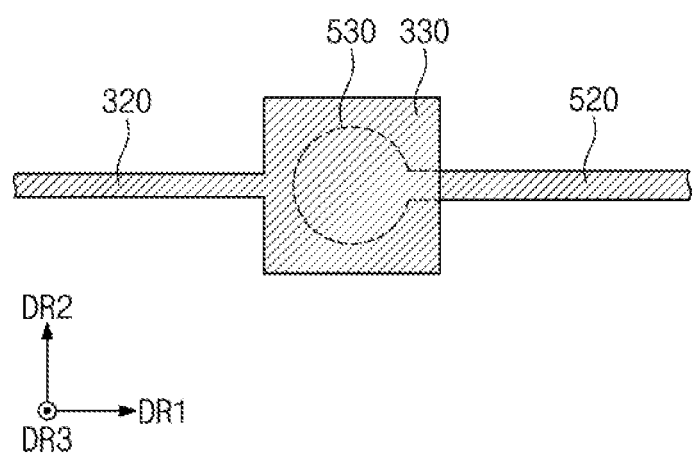
FIG. 7 is a plan view showing a first pad and a second pad according to an embodiment of the present disclosure.

FIG. 6 is a cross-sectional view showing an electronic apparatus 1000 according to an embodiment of the present disclosure. FIG. 7 is a plan view showing a first pad and a second pad according to an embodiment of the present disclosure.

Referring to FIGS. 6 and 7, the window 400 may include a flat portion 400MA and a bending portion 400BA which are defined therein. The flat portion 400MA may correspond to the first display surface 1000MA (refer to FIG. 1). The bending portion 400BA may correspond to the second display surface 1000BA (refer to FIG. 1). The antenna pattern 310 may overlap the bending portion 400BA.

A portion of each of the display panel 100, the input sensor 200, and the antenna 300 may be bent to correspond to the bending portion 400BA.

Each of the display panel 100, the input sensor 200, and the antenna 300 may be bent with respect to a bending axis BX. The bending axis BX may be substantially parallel to the second direction DR2. As the display panel 100, the input sensor 200, and the antenna 300 are bent, a circuit portion 500 electrically connected to the line 320 may face a rear surface 100-B of the display panel 100.

The electronic apparatus 1000 may further include the circuit portion 500 and a dielectric layer 600.

The circuit portion 500 may include a base layer 500-1, a radio frequency device 510, a circuit line 520, and a second pad 530.

The radio frequency device 510 may be mounted on the base layer 500-1. The radio frequency device 510 may process a signal transmitted or received from the antenna pattern 310. For example, the radio frequency device 510 may change a phase of the signal received from the antenna pattern 310 and may amplify an amplitude of the signal. The radio frequency device 510 may integrate signals received from the antenna pattern 310. As another example, the radio frequency device 510 may transmit the signal to the antenna pattern 310. The radio frequency device 510 may change a phase of the signal and may amplify an amplitude of the signal.

The circuit line 520 may electrically connect the radio frequency device 510 to the second pad 530. The second pad 530 may face the first pad 330. The second pad 530 may be spaced apart from the first pad 330 by a predetermined distance PD. The first pad 330 and the second pad 530 may be electrically connected to each other through a capacitive coupling.

Capacitive coupling refers to the transfer of energy between distant circuit elements by means of a displacement current between the circuit elements induced by an electric field. In some cases, capacitive coupling may connect two circuits such that only an AC signal can pass through, while DC signals are blocked.

The first pad 330 may overlap the second pad 530 in a plan view. One pad of the first pad 330 and the second pad 530 may have a size greater than a size of the other pad of the first pad 330 and the second pad 530. For example, FIG. 7 shows the first pad 330 with the size greater than that of the second pad 530, however, this is merely exemplary. According to another embodiment of the present disclosure, the size of the first pad 330 may be smaller than the size of the second pad 530.

An area in which the first pad 330 overlaps the second pad 530 may have a size corresponding to the size of the first pad 330 or the second pad 530, whichever is smaller. For example, FIG. 7 shows that the size of the area in which the first pad 330 overlaps the second pad 530 is the same as the size of the second pad 530, however, this is merely exemplary. According to another embodiment of the present disclosure, the size of the first pad 330 may be smaller than the size of the second pad 530, and the size of the area in which the first pad 330 overlaps the second pad 530 may be the same as the size of the first pad 330.

The first pad 330 may have a quadrangular shape in a plan view. The second pad 530 may have a circular shape in a plan view. A length of a side of the first pad 330 may be greater than a length of a diameter of the second pad 530. Accordingly, the first pad 330 may have a size greater than that of the second pad 530 in a plan view, however, this is merely exemplary. The shape of the first pad 330 and the second pad 530 is not limited thereto or thereby. For example, according to another embodiment of the present disclosure, the first pad 330 may have a circular shape, the second pad 530 may have a quadrangular shape, and a length of a diameter of the first pad 330 may be smaller than a length of a side of the second pad 530.

According to embodiments of the present disclosure, since the size of one pad of the first pad 330 and the second pad 530 is greater than the size of the other pad of the first pad 330 and the second pad 530, a size of the area where the first pad 330 overlaps the second pad 530 may be constant even though a process error occurs in a process of aligning the first pad 330 and the second pad 530. In the capacitive coupling, which is achieved by capacitance, since the size of area where the first pad 330 and the second pad 530 are connected is constant, a capacitance between the first pad 330 and the second pad 530 may be kept constant. Therefore, an impedance matching between the first pad 330 and the second pad 530 may be facilitated, and a reflection loss due to an impedance mismatch may be reduced. Therefore, the electronic apparatus 1000 with the antenna with increased power transmission efficiency may be provided.

The dielectric layer 600 may be disposed between the first pad 330 and the second pad 530. The dielectric layer 600 may include an organic layer 610 and a spacer 620.

The organic layer 610 may include an organic material with an adhesive property. The organic layer 610 may be coupled to the first pad 330 and the second pad 530.

The spacer 620 may be disposed in the organic layer 610. The spacer 620 may have a thickness TK equal to the predetermined distance PD. The spacer 620 may be distributed in the organic layer 610. The spacer 620 may have a spherical shape, however, this is merely exemplary. The shape of the spacer 620 according to the embodiment of the present disclosure is not limited thereto or thereby and may have a variety of shapes. The spacer 620 may include an organic material or a ceramic.

The organic layer 610 may have a dielectric constant similar to a dielectric constant of the spacer 620. A difference in the value of the dielectric constant between the organic layer 610 and the spacer 620 may be in a range equal to or greater than 0 F/m and equal to or smaller than about 0.4 F/m. When the difference in the value of the dielectric constant between the organic layer 610 and the spacer 620 exceeds about 0.4 F/m, the capacitance between the first pad 330 and the second pad 530 may be different depending on whether the spacer 620 is arranged. However, the difference in the value of the dielectric constant between the organic layer 610 and the spacer 620 according to the present disclosure may be in a range equal to or greater than 0 F/m and equal to or smaller than about 0.4 F/m, and a difference in capacitance between the first pad 330 and the second pad 530 may be reduced.

According to the present disclosure, the spacer 620 may uniformly maintain the predetermined distance PD between the first pad 330 and the second pad 530, and the capacitance between the first pad 330 and the second pad 530 may also be uniformly maintained. Therefore, the impedance matching between the first pad 330 and the second pad 530 may be facilitated, and the reflection loss due to the impedance mismatch may be reduced. As a result, the electronic apparatus 1000 may be provided with an antenna having increased power transmission efficiency.

According to at least one embodiment, an electronic device (e.g., electronic apparatus 1000) may include an antenna pattern (e.g., antenna pattern 310); an antenna line (e.g., line 320) electrically connected to the antenna pattern; a first pad (e.g., first pad 330) electrically connected to the antenna line; a radio device (e.g., radio frequency device 510); a circuit line (e.g., circuit line 520) electrically connected to the radio device; and a second pad (e.g., second pad 530) electrically connected to the circuit line and capacitively coupled to the first pad.

Some embodiments may include an adhesive layer (e.g., organic layer 610) connecting the first pad and the second pad; and at least one spacer (e.g., spacer 620) located between the first pad and the second pad, wherein the adhesive layer and the at least one spacer have a similar dielectric constant, and wherein a distance between the first pad and the second pad is determine by the at least one spacer. In some embodiments, the antenna line is configured to bend along with the electronic device. In some embodiments, an overlap between the first pad and the second pad is equal to a size of the first pad or a size of the second pad.

Alternatively, the first pad and the second pad may be electrically connected directly to each other. For example, the first pad and the second pad may be electrically connected to each other by conductive particles of an anisotropic conductive film (ACF). In this case, a resistance characteristic may change depending on the number of the conductive particles disposed between the first pad and the second pad or a pressure applied to the pads. However, according to the present disclosure, the area where the first pad 330 and the second pad 530 are connected to each other may be constant and the predetermined distance PD between the first pad 330 and the second pad 530 may be constant. Accordingly, the capacitance between the first pad 330 and the second pad 530 may be maintained uniformly.

According to the present disclosure, the first pad 330 and the second pad 530 may facilitate the impedance matching according to the capacitive coupling in which the capacitance is maintained constantly and may reduce the reflection loss due to the impedance mismatch. In addition, the antenna pattern 310 and the radio frequency device 510 may transmit a high frequency signal due to the capacitive coupling. Therefore, the electronic apparatus 1000 with the antenna with increased power transmission efficiency may be provided.

Figure 8:
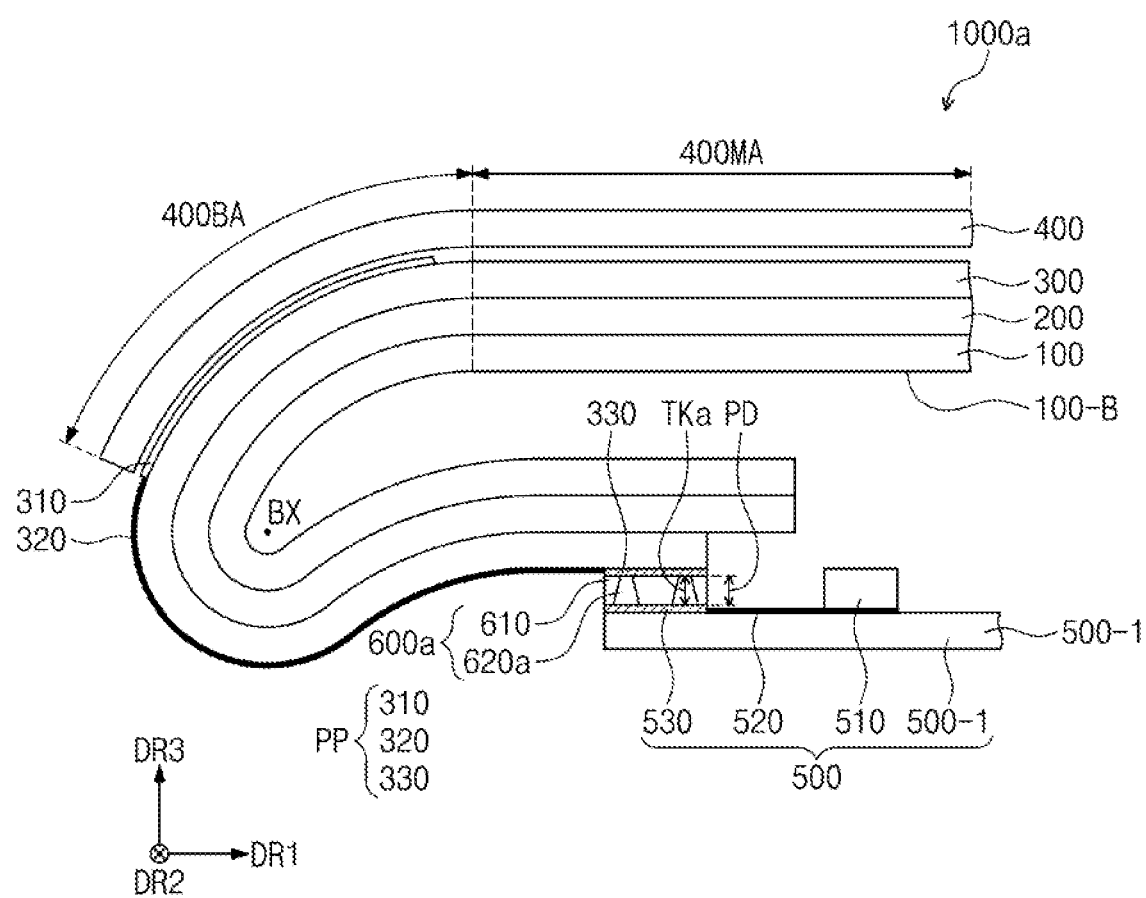
FIG. 8 is a cross-sectional view showing an electronic apparatus according to an embodiment of the present disclosure.

FIG. 8 is a cross-sectional view showing an electronic apparatus 1000*a* according to an embodiment of the present disclosure. In FIG. 8, the same reference numerals denote the same elements in FIG. 6. Therefore, detailed descriptions of the same elements will be omitted.

Referring to FIG. 8, a dielectric layer 600*a* may include an organic layer 610 and a spacer 620*a*. The spacer 620*a* may be disposed between a first pad 330 and a second pad 530. The spacer 620*a* may be formed by a patterning process. The spacer 620*a* may have a trapezoidal shape, however, this is merely exemplary, and the shape of the spacer 620*a* according to the embodiment of the present disclosure is not limited thereto or thereby.

According to the present disclosure, the spacer 620*a* may uniformly maintain a predetermined distance PD between the first pad 330 and the second pad 530. In the capacitive coupling which is achieved by capacitance, the capacitance between the first pad 330 and the second pad 530 may be uniformly maintained. Therefore, the impedance matching between the first pad 330 and the second pad 530 may be facilitated, and the reflection loss due to the impedance mismatch may be reduced. As a result, the electronic apparatus 1000*a* with the antenna with increased power transmission efficiency may be provided.

Figure 9:
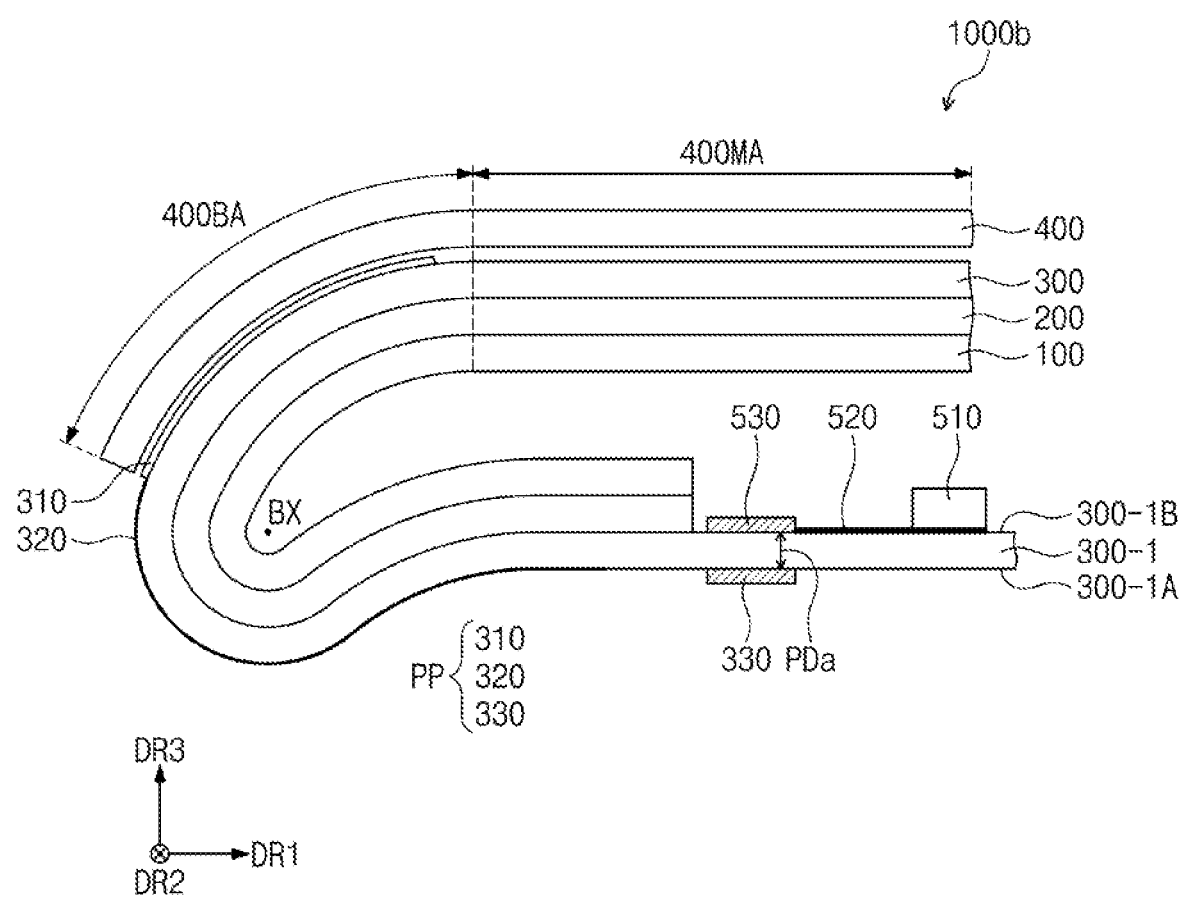
FIG. 9 is a cross-sectional view showing an electronic apparatus according to an embodiment of the present disclosure.

FIG. 9 is a cross-sectional view showing an electronic apparatus 1000*b* according to an embodiment of the present disclosure. In FIG. 9, the same reference numerals denote the same elements in FIG. 6. Therefore, detailed descriptions of the same elements will be omitted.

Referring to FIG. 9, a first pad 330 may be disposed on a first surface 300-1A of a base layer 300-1. A second pad 530 may be disposed on a second surface 300-1B facing the first surface 300-1A.

The first pad 330 and the second pad 530 may be spaced apart from each other by a predetermined distance PDa. The predetermined distance PDa may be equal to a thickness of the base layer 300-1.

According to the present disclosure, a distance between the first pad 330 and the second pad 530 may be uniformly maintained as the predetermined distance PDa by the base layer 300-1. In the capacitive coupling which is achieved by capacitance, the capacitance between the first pad 330 and the second pad 530 may be uniformly maintained. Therefore, the impedance matching between the first pad 330 and the second pad 530 may be facilitated, and the reflection loss due to the impedance mismatch may be reduced. As a result, the electronic apparatus 1000b with the antenna with increased power transmission efficiency may be provided.

Figure 10:
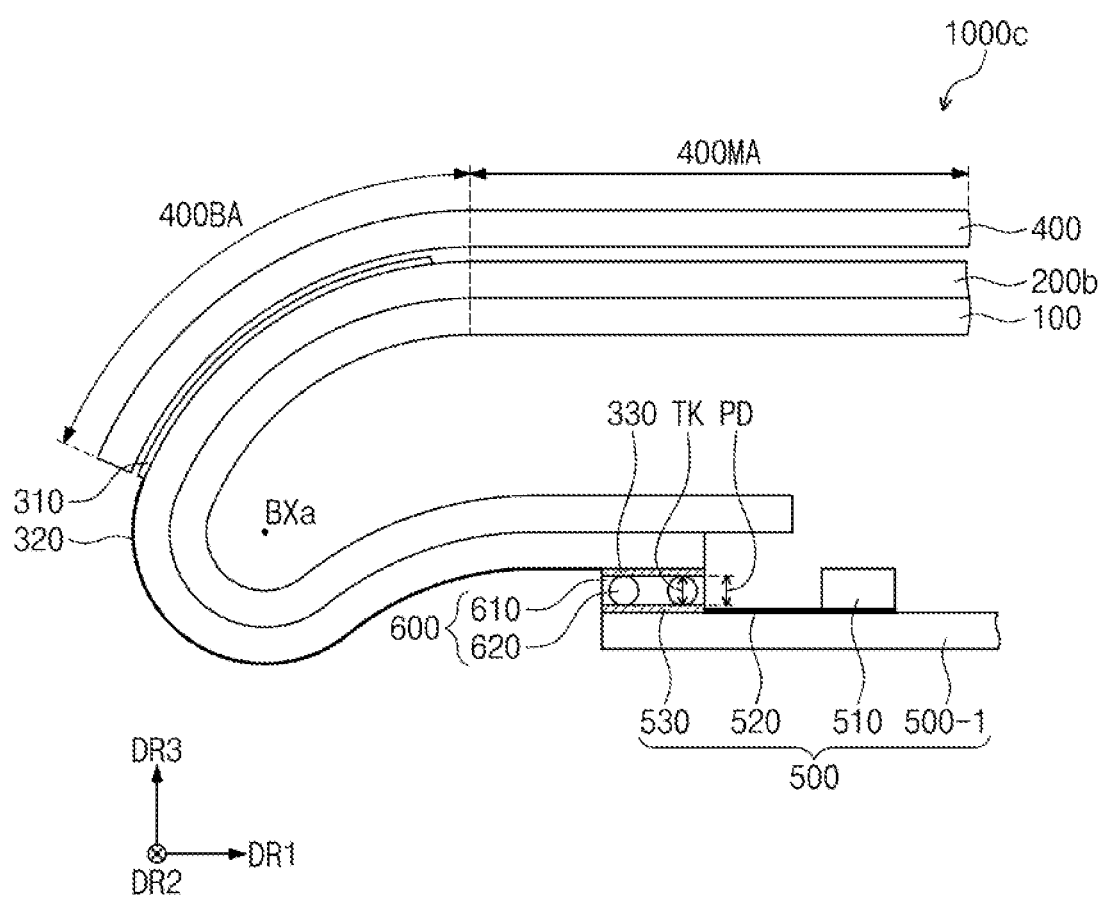
FIG. 10 is a cross-sectional view showing an electronic apparatus according to an embodiment of the present disclosure.
Figure 11:
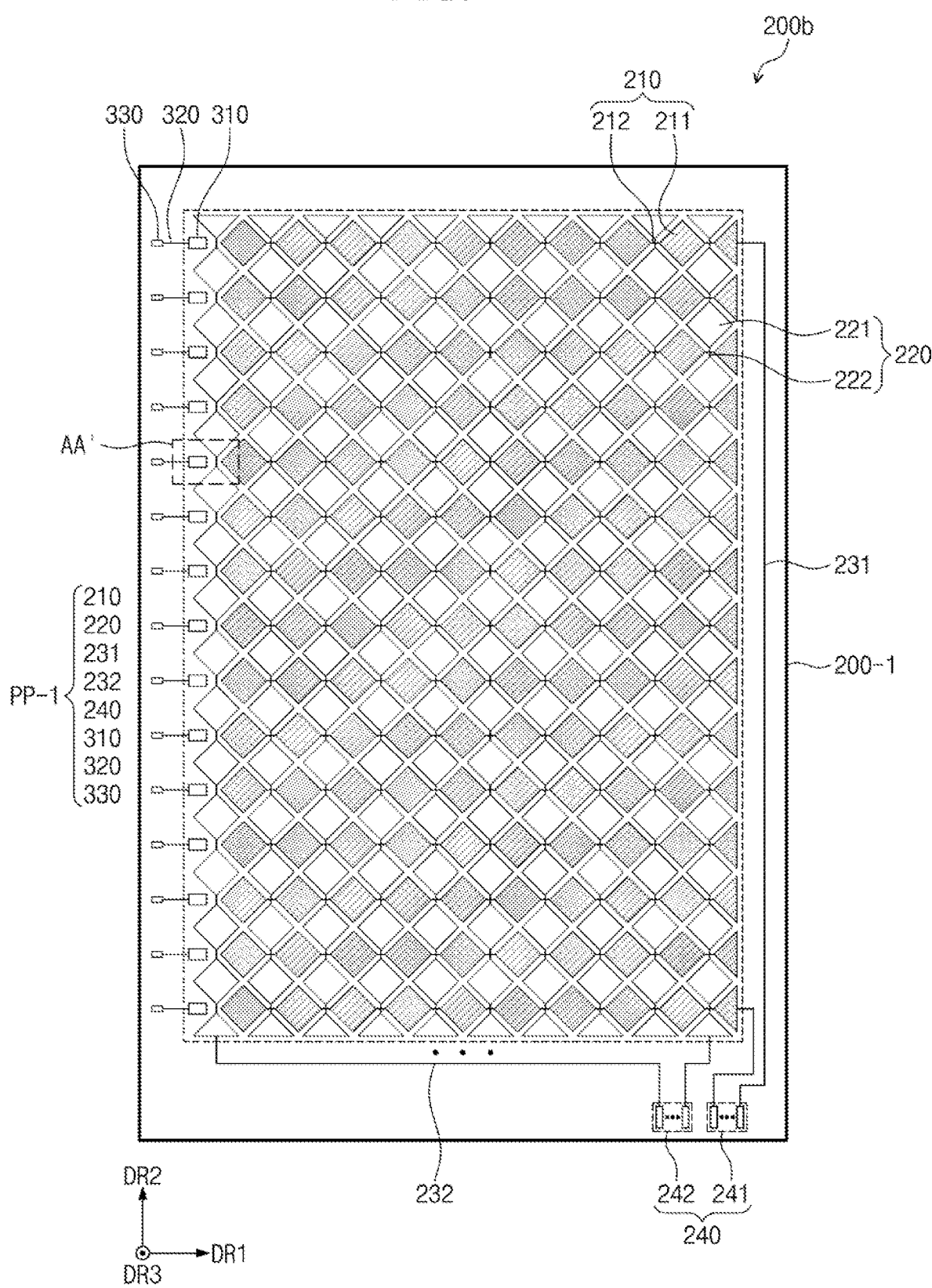
FIG. 11 is a plan view showing an input sensor according to an embodiment of the present disclosure.

FIG. 10 is a cross-sectional view showing an electronic apparatus 1000c according to an embodiment of the present disclosure, and FIG. 11 is a plan view showing an input sensor 200b according to an embodiment of the present disclosure. In FIG. 10, the same reference numerals denote the same elements in FIG. 6. Therefore, detailed descriptions of the same elements will be omitted.

Referring to FIGS. 10 and 11, the electronic apparatus 1000c may include a display panel 100, an input sensor 200b, a window 400, a circuit portion 500, and a dielectric layer 600.

A pattern portion PP-1 may be disposed on a base insulating layer 200-1. The pattern portion PP-1 may include an antenna pattern 310, a line 320, a first pad 330, a plurality of first and second sensing electrodes 210 and 220, a plurality of sensing lines 231 and 232, and a plurality of sensing pads 240.

Some of the first and second sensing electrodes 210 and 220 may be omitted, and the antenna pattern 310 may be disposed in areas from which some of each of the first and second sensing electrodes 210 and 220 are omitted. In FIG. 11, some of first sensing patterns 211 are omitted, and the antenna pattern 310 is disposed in the areas from which the some of the first sensing patterns 211 are omitted, however, the first sensing patterns 211 is not limited thereto or thereby.

The antenna pattern 310 may be disposed on the same layer as the sensing patterns 211 and 221. For example, the antenna pattern 310 and the sensing patterns 211 and 221 may be disposed on the base insulating layer 200-1.

The antenna pattern 310 may include the same material as the sensing patterns 211 and 221 and may be formed through the same process as the sensing patterns 211 and 221. For example, the sensing patterns 211 and 221 and the antenna pattern 310 may include a carbon nanotube, a metal material, a metal alloy, or composites thereof and may have a single-layer or multi-layer structure. However, this is merely exemplary, and the antenna pattern 310 according to the embodiment of the present disclosure may include a different material from the sensing patterns 211 and 221 and may be formed through a separate process. For example, the sensing patterns 211 and 221 may have the multi-layer structure in which titanium (Ti), aluminum (Al), and titanium (Ti) are sequentially stacked, and the antenna pattern 310 may include a carbon nanotube, a metal material, a metal alloy, or composites thereof and may have a single-layer or multi-layer structure. For example, the metal material may be silver (Ag), copper (Cu), aluminum (Al), gold (Au), or platinum (Pt), however, the metal material is not limited thereto or thereby.

Figure 12:
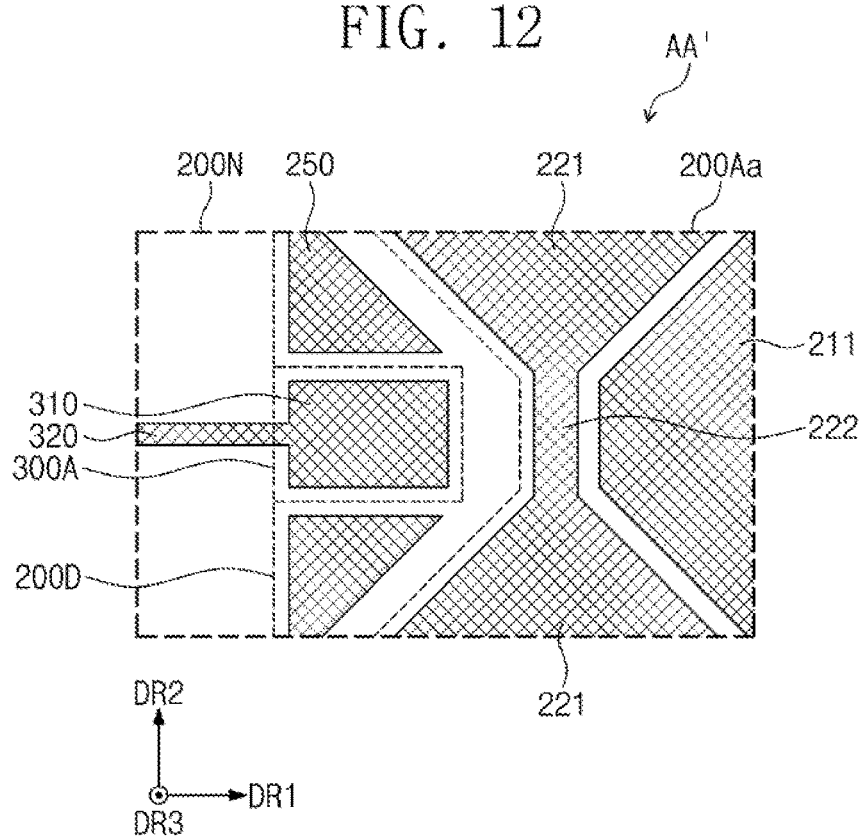
FIG. 12 is an enlarged plan view showing a portion AA' shown in FIG. 11 according to an embodiment of the present disclosure.

FIG. 12 is an enlarged plan view showing a portion AA' shown in FIG. 11 according to an embodiment of the present disclosure.

Referring to FIGS. 11 and 12, the input sensor 200b may further include a dummy electrode 250.

A sensing area 200Aa, an antenna area 300A, a dummy area 200D, and a peripheral area 200N may be defined in the input sensor 200b. The first and second sensing electrodes 210 and 220 are disposed in the sensing area 200Aa. The antenna pattern 310 and the line 320 are disposed in the antenna area 300A. The dummy electrode 250 is disposed in the dummy area 200D. The sensing area 200Aa, the antenna area 300A, and the dummy area 200D are surrounded by the peripheral area 200N.

The dummy electrode 250 may be disposed in the dummy area 200D defined between the sensing area 200Aa and the antenna area 300A. When the dummy electrode 250 is not disposed, a reflectance and a transmittance of the dummy area 200D may be different from the reflectance and the transmittance of the sensing area 200Aa and the antenna area 300A. However, since the dummy electrode 250 is disposed, the reflectance difference and the transmittance difference may be reduced. As a result, a specific boundary, e.g., a boundary between the antenna pattern 310 and the second sensing pattern 221 or a boundary between the antenna pattern 310 and a second connection pattern 222 may be prevented from being viewed.

The sensing area 200Aa, the antenna area 300A, and the dummy area 200D may overlap the active area 100A (refer to FIG. 3) of the display panel 100 (refer to FIG. 3). Therefore, the size of the sensing area 200Aa may be smaller than the size of the active area 100A (refer to FIG. 3).

Figure 13:
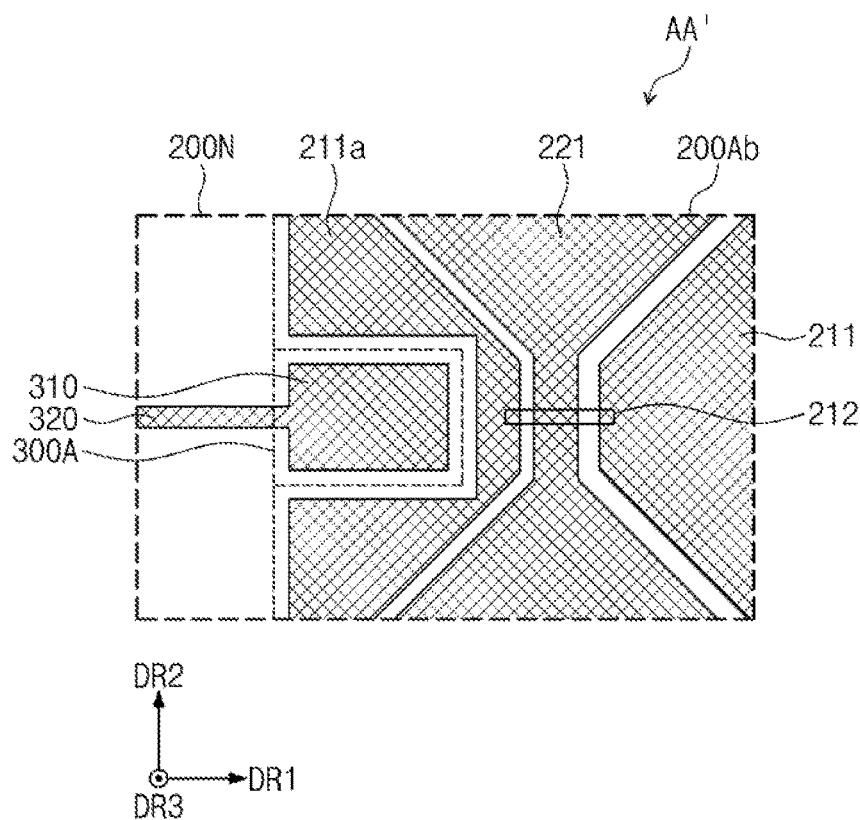
FIG. 13 is an enlarged plan view showing a portion AA' shown in FIG. 11 according to an embodiment of the present disclosure.

FIG. 13 is an enlarged plan view showing a portion AA' shown in FIG. 11 according to an embodiment of the present disclosure.

Referring to FIGS. 11 and 13, a sensing area 200Ab, an antenna area 300A, and a peripheral area 200N may be defined in the input sensor 200b. The first and second sensing electrodes 210 and 220 are disposed in the sensing area 200Ab. The antenna pattern 310 and the line 320 are disposed in the antenna area 300A. The sensing area 200Ab and the antenna area 300A is surrounded by the peripheral area 200N.

Some sensing patterns 211a of the sensing patterns 211 and 221 may be patterned to correspond to a shape of the antenna pattern 310. For example, the sensing pattern 211a may be patterned to be spaced apart from the antenna pattern 310 by a predetermined distance. In this case, a size of the sensing area 200Ab in which the external input is sensed may be greater than the size of the sensing area 200Aa of the embodiment described with reference to FIG. 12. In addition, since the sensing pattern 211a is disposed around the antenna pattern 310, a phenomenon in which the antenna pattern 310 is viewed due to the reflectance difference and the transmittance difference may be prevented.

The sensing area 200Ab and the antenna area 300A may overlap the active area 100A (refer to FIG. 3) of the display panel 100 (refer to FIG. 3). Therefore, the size of the sensing area 200Ab may be smaller than the size of the active area 100A (refer to FIG. 3).

Although the embodiments of the present disclosure have been described, it is understood that the present disclosure is not limited to these embodiments but various changes and modifications can be made by one ordinary skilled in the art within the spirit and scope of the present disclosure as hereinafter claimed. Therefore, the disclosed subject matter is not limited to any single embodiment described herein, and the scope of the present inventive concept shall be determined according to the attached claims.

What is claimed is:

1. An electronic apparatus comprising:
a display panel including an active area and a peripheral area;
a pattern portion comprising an antenna pattern disposed on the display panel and a first pad connected to the antenna pattern; and
a circuit portion comprising a second pad facing the first pad, spaced apart from the first pad by a predetermined distance, and capacitive-coupled to the first pad, the circuit portion further comprising a radio frequency device electrically connected to the second pad; and a dielectric layer disposed between the first pad and the second pad and comprising an organic layer and a spacer disposed in the organic layer.

2. The electronic apparatus of claim 1, wherein a size of one pad of the first pad and the second pad is greater than a size of the other pad of the first pad and the second pad.

3. The electronic apparatus of claim 1, wherein the first pad overlaps the second pad in a plan view.

4. The electronic apparatus of claim 3, wherein a size of an area where the first pad overlaps the second pad is equal to a smallest size among a size of the first pad and a size of the second pad.

5. The electronic apparatus of claim 1, wherein the antenna pattern overlaps the active area in a plan view.

6. The electronic apparatus of claim 1, wherein the spacer has a thickness that is equal to the predetermined distance.

7. The electronic apparatus of claim 1, wherein the organic layer attaches the first pad to the second pad.

8. The electronic apparatus of claim 1, wherein the pattern portion further comprises:
    a plurality of sensing electrodes disposed to overlap the active area;
    a plurality of sensing lines disposed to overlap the peripheral area and electrically connected to respective ones of the sensing electrodes; and
    a plurality of sensing pads disposed to overlap the peripheral area and electrically connected to respective ones of the sensing lines.

9. The electronic apparatus of claim 8, wherein each of the sensing electrodes comprises a plurality of sensing patterns and a connection pattern connecting two sensing patterns adjacent to each other among the sensing patterns, and wherein the sensing patterns are disposed on a same layer as the antenna pattern.

10. The electronic apparatus of claim 1, further comprising an input sensor disposed between the display panel and the pattern portion, wherein the input sensor comprises:
    a plurality of sensing electrodes disposed to overlap the active area;
    a plurality of sensing lines disposed to overlap the peripheral area and electrically connected to respective ones of the sensing electrodes; and
    a plurality of sensing pads disposed to overlap the peripheral area and electrically connected to respective ones of the sensing lines.

11. The electronic apparatus of claim 10, wherein the antenna pattern overlaps the sensing electrodes.

12. The electronic apparatus of claim 10, wherein the antenna pattern does not overlap the sensing electrodes.

13. The electronic apparatus of claim 1, further comprising a window disposed on the display panel.

14. The electronic apparatus of claim 13, wherein the window comprises a flat portion and a bending portion configured to bend from the flat portion, wherein the flat portion and the bending portion overlap the active area.

15. The electronic apparatus of claim 14, wherein the bending portion overlaps the antenna pattern.

16. The electronic apparatus of claim 1, wherein the pattern portion further comprises a line that electrically connects the antenna pattern to the first pad, wherein the line is configured to bend toward a lower surface of the display panel, and wherein the circuit portion is disposed under the display panel.

17. The electronic apparatus of claim 16, wherein the line and the first pad overlap the peripheral area.

* * * * *